(12) United States Patent
Taniguchi

(10) Patent No.: US 10,099,181 B2
(45) Date of Patent: Oct. 16, 2018

(54) HOLLOW FIBER MEMBRANE MODULE

(71) Applicant: ASAHI KASEI KABUSHIKI KAISHA, Tokyo (JP)

(72) Inventor: Tohru Taniguchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/236,592

(22) Filed: Aug. 15, 2016

(65) Prior Publication Data

US 2017/0050148 A1    Feb. 23, 2017

(30) Foreign Application Priority Data

Aug. 17, 2015 (JP) ................... 2015-160484
Jul. 11, 2016 (JP) ................... 2016-136591

(51) Int. Cl.
| B01D 63/00 | (2006.01) |
| B01D 63/04 | (2006.01) |
| B01D 63/02 | (2006.01) |

(52) U.S. Cl.
CPC .......... *B01D 63/04* (2013.01); *B01D 63/022* (2013.01); *B01D 2313/04* (2013.01); *B01D 2313/21* (2013.01); *B01D 2317/04* (2013.01)

(58) Field of Classification Search
CPC ...... B01D 63/04; B01D 63/022; B01D 63/02; B01D 63/024; B01D 2317/04; B01D 29/096; B01D 33/056; B01D 2313/21; B01D 2313/04
USPC ............................................ 210/321.89, 450
See application file for complete search history.

(56) References Cited

U.S. PATENT DOCUMENTS

| 3,882,024 A | * | 5/1975 | Holmes ................. | B01D 63/02 210/321.8 |
| 5,139,669 A | * | 8/1992 | Clermont ............... | B01D 63/02 210/321.8 |
| 8,182,592 B2 | * | 5/2012 | Nakamura ............. | B01D 53/22 210/321.88 |
| 2015/0034546 A1 | | 2/2015 | Inuzuka et al. | |

FOREIGN PATENT DOCUMENTS

WO        2013/136903        9/2013

* cited by examiner

*Primary Examiner* — Claire A Norris
*Assistant Examiner* — Julia L. Wun
(74) *Attorney, Agent, or Firm* — Greenblum & Bernstein, P.L.C.

(57) ABSTRACT

In a hollow fiber membrane module including a housing case, potting material loaded into the housing case, a cap attached to each of both ends of the housing case, and an O-ring closely held by the potting material and the cap, a whole area of the O-ring between a first contact point and a second contact point is exposed when the area is viewed from a central axis passing through a center of the ring shape of the O-ring, the first contact point being a point of contact between the O-ring and the cap, which faces inner cavity defined by an end surface of the potting material facing the cap, an inner circumferential surface of the O-ring and an inner circumferential surface of the cap, and the second contact point being a point of contact between the O-ring and the potting material, which faces the inner cavity.

13 Claims, 15 Drawing Sheets

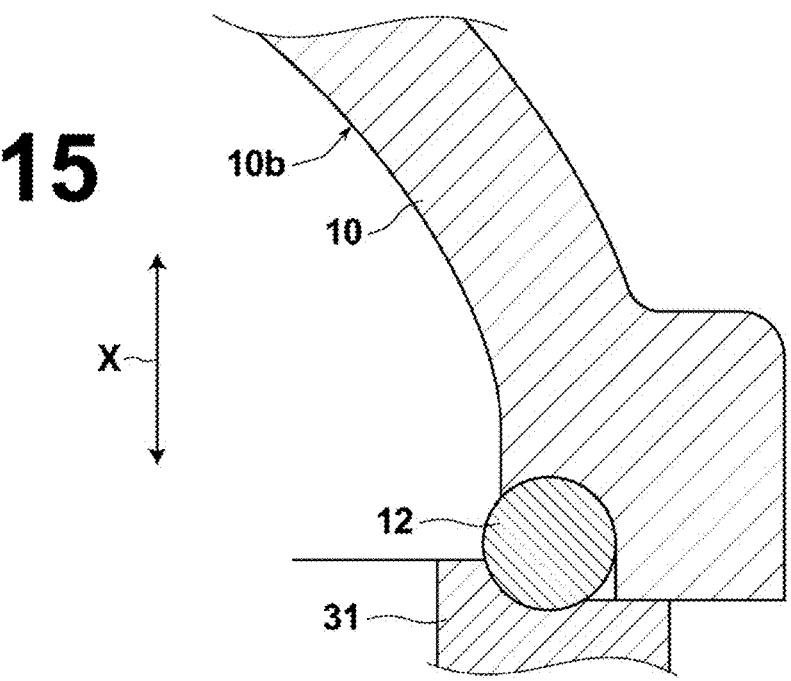
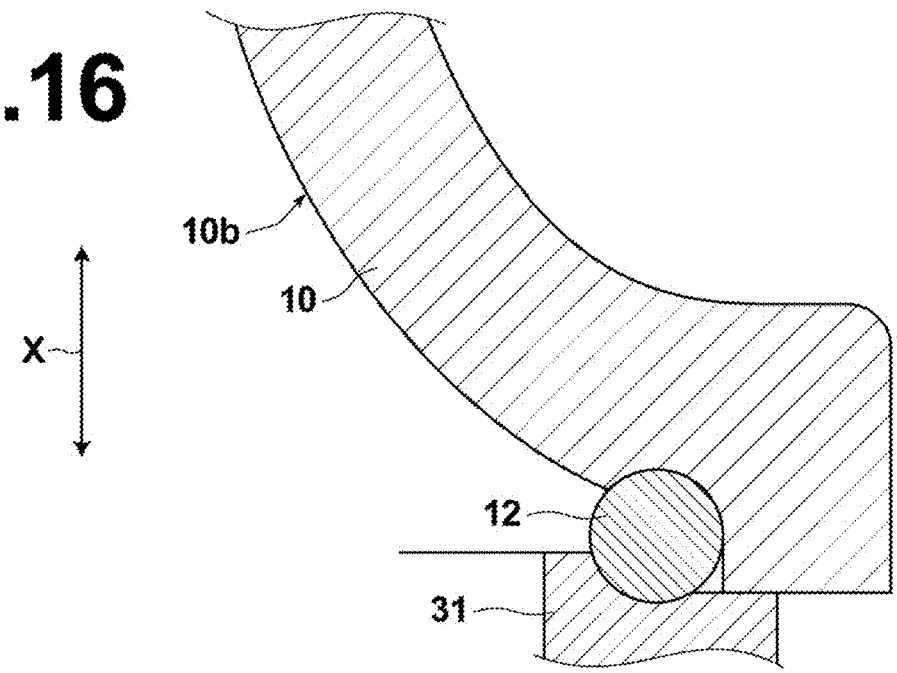

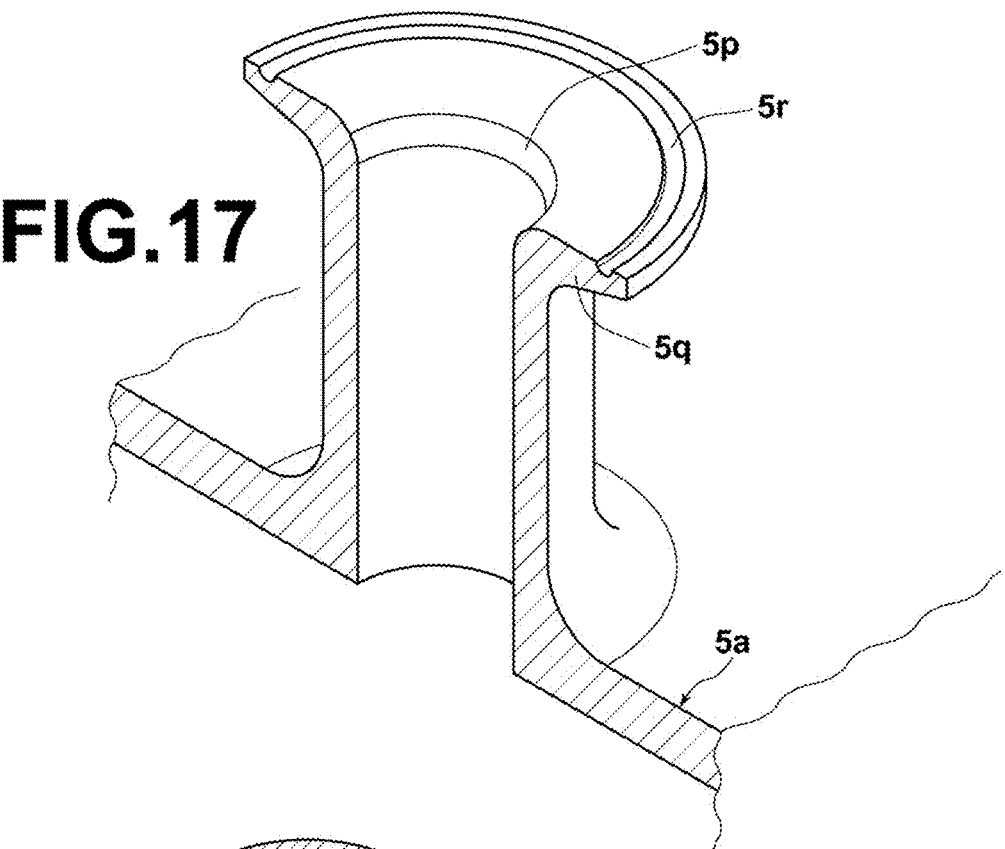
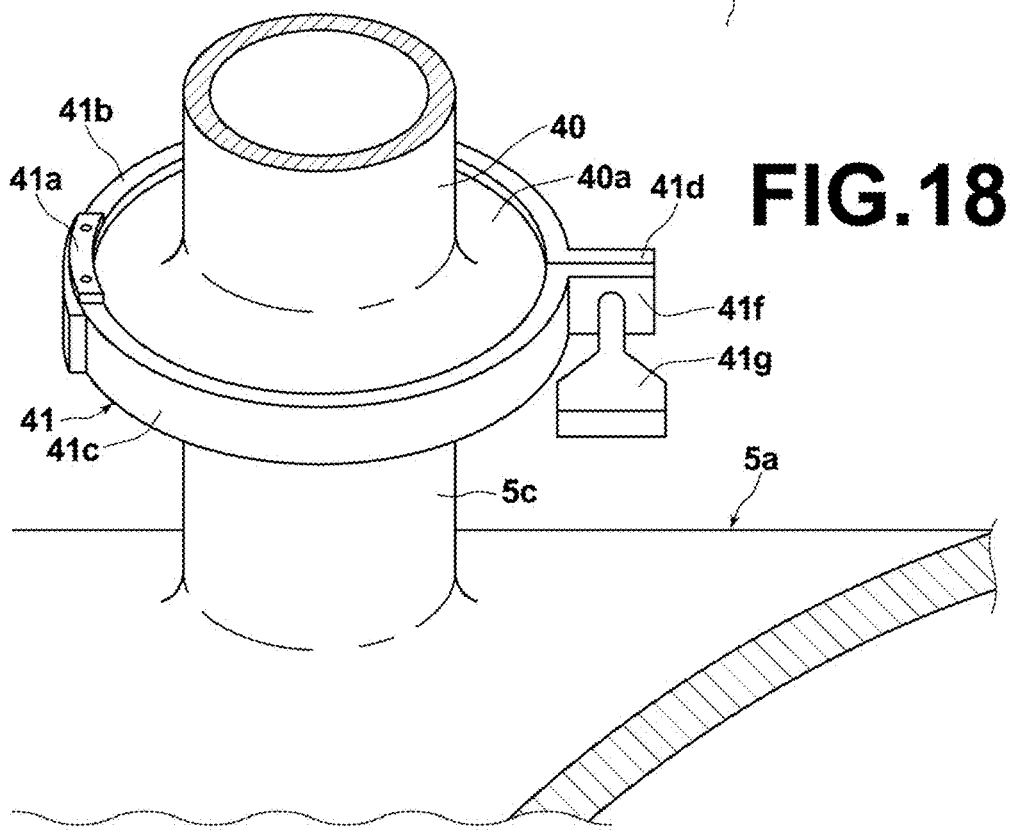

HOLLOW FIBER MEMBRANE MODULE

CROSS-REFERENCE TO RELATED APPLICATION

The present application claims priority under 35 U.S.C. § 119 to Japanese Patent Application No. 2015-160484, filed on Aug. 17, 2015, and Japanese Patent Application No. 2016-136591, filed on Jul. 11, 2016. The above applications are hereby expressly incorporated by reference, in their entirety, into the present application.

BACKGROUND

The present disclosure relates to a hollow fiber membrane module including a hollow fiber membrane bundle composed of plural hollow fiber membranes bundled together. In particular, the present disclosure relates to the structure of a housing case that houses the hollow fiber membrane bundle.

In the fields of semiconductor production, food industries and the like, hollow fiber membrane modules, in which hollow fiber membrane bundles composed of plural hollow fiber membranes bundled together are housed in housing cases (casings), are widely used for gas-liquid absorption, degasification, filtration and the like.

In many cases, the housing case is made of synthetic resin, metal or the like, and formed into a tubular shape, such as a cylinder, and a nozzle through which liquid to be processed or fluid after processing by a hollow fiber membrane bundle passes is provided in the vicinity of each end of the housing case. Further, caps, each including a tubular channel through which liquid to be processed or fluid after processing by the hollow fiber membrane bundle passes, are attached to both ends of the tubular housing case.

In the case that the caps are attached to both ends of the housing case as described above, it is necessary that the internal space of the housing case defined by the housing case and the caps is liquid-tightly sealed against the outside of the housing case.

For such seal, an O-ring is used in many cases. As specific structure in which this O-ring is arranged, conventionally, structure in which an O-ring is arranged between a flat surface formed on a cap and a flat surface formed on a housing case facing the flat surface of the cap in a parallel state is known. In this structure, when a cap is attached to the housing case, both of the cap and the housing case press the O-ring by their flat surfaces in contact with the O-ring, and a sealed state by the O-ring is achieved. International Patent Publication No. 2013/136903 (Patent Document 1) discloses an example of such seal structure.

SUMMARY

However, in the seal structure as disclosed in Patent Document 1, an area in which fluid stagnates tends to be generated between the flat surface on the housing case or the cap and the surface of the O-ring on the inside of the O-ring. If this area in which fluid stagnates is generated, a minute solid component contained in water to be processed enters and remains in the area. Therefore, the sanitary characteristics of a hollow fiber membrane module are damaged.

In view of the foregoing circumstances, the present disclosure is directed to provide a hollow fiber membrane module that can reduce an area in which fluid stagnates in the vicinity of the O-ring, which seals the internal space of the housing case against the outside.

In a hollow fiber membrane module of the present disclosure including a hollow fiber membrane bundle composed of plural of hollow fiber membranes bundled together, a tubular housing case that houses the hollow fiber membrane bundle, potting material that bonds and fixes the hollow fiber membranes together at least at an end portion of each of the hollow fiber membranes, and fills a space reaching an inner circumferential surface of the housing case, a cap attached to each of both ends of the housing case, and an O-ring closely held by the potting material and the cap, a whole area of the O-ring between a first contact point and a second contact point is exposed when the area is viewed from a central axis passing through a center of the ring shape of the O-ring, the first contact point being a point of contact between the O-ring and the cap, which faces an inner cavity defined by an end surface of the potting material facing the cap, an inner circumferential surface of the O-ring and an inner circumferential surface of the cap, and the second contact point being a point of contact between the O-ring and the potting material, which faces the inner cavity.

In the hollow fiber membrane module of the present disclosure, it is desirable that the first contact point is located closer to the potting material than a point located furthest toward the cap in the direction of the central axis on the inner circumferential surface of the O-ring.

In the hollow fiber membrane module of the present disclosure, it is desirable that the second contact point is located closer to the cap than a point located furthest toward the potting material in the direction of the central axis on the inner circumferential surface of the O-ring.

In the hollow fiber membrane module of the present disclosure, it is desirable that an angle formed by a straight line connecting the first contact point and the second contact point and at least one of the inner circumferential surface of the cap and the end surface of the potting material is an obtuse angle on a cross section passing through a central axis of the housing case.

In the hollow fiber membrane module of the present disclosure, it is desirable that a distance between the first contact point and the second contact point is 15% or more and 50% or less of the diameter of a cross section of the O-ring.

In the hollow fiber membrane module of the present disclosure, it is desirable that an angle formed by a straight line on the inner circumferential surface of the cap and a tangent to the O-ring that passes through the first contact point exceeds 0 degree on a cross section passing through a central axis of the housing case.

In the hollow fiber membrane module of the present disclosure, it is desirable that an angle formed by a straight line on the end surface of the potting material facing the cap and a tangent to the O-ring that passes through the second contact point exceeds 0 degree on a cross section passing through the central axis of the housing case.

In the hollow fiber membrane module of the present disclosure, it is desirable that an inner surface of the cap has a tapered surface in which the diameter of the inner surface gradually increases as approaching the housing case, and that the tapered surface and the end surface of the potting material are connected to each other through only a circumferential surface of the O-ring therebetween.

In the hollow fiber membrane module of the present disclosure including a tubular housing case that houses a hollow fiber membrane bundle, potting material filling a space reaching an inner circumferential surface of the housing case, a cap attached to each of both ends of the housing case, and an O-ring closely held by the potting material and the cap, the hollow fiber membrane module is configured in such a manner that a whole area of the O-ring between a first contact point and a second contact point is exposed when the area is viewed from a central axis passing through the center of the ring shape of the O-ring, the first contact point being a point of contact between the O-ring and the cap, which faces the inner cavity defined by an end surface of the potting material facing the cap, an inner circumferential surface of the O-ring and an inner circumferential surface of the cap, and the second contact point being a point of contact between the O-ring and the potting material, which faces the inner cavity. Therefore, it is possible to reduce an area in which fluid stagnates in the vicinity of the O-ring.

BRIEF DESCRIPTION OF THE DRAWINGS

FIG. 15 is a diagram illustrating a modification example of a hollow fiber membrane module according to an embodiment of the present disclosure;

FIG. 16 is a diagram illustrating a modification example of a hollow fiber membrane module according to an embodiment of the present disclosure;

FIG. 17 is a partially-cut perspective view illustrating a nozzle part in the hollow fiber membrane module;

FIG. 18 is a partially-cut perspective view illustrating connection structure of a nozzle and piping in the hollow fiber membrane module;

DETAILED DESCRIPTION OF THE PREFERRED EMBODIMENTS

Hereinafter, an embodiment of a hollow fiber membrane module of the present disclosure will be described with reference to drawings. The hollow fiber membrane module according to the present embodiment is applicable to various fields, such as water and sewage, food industries, general manufacturing, medicine, and physics and chemistry.

Figure 1:
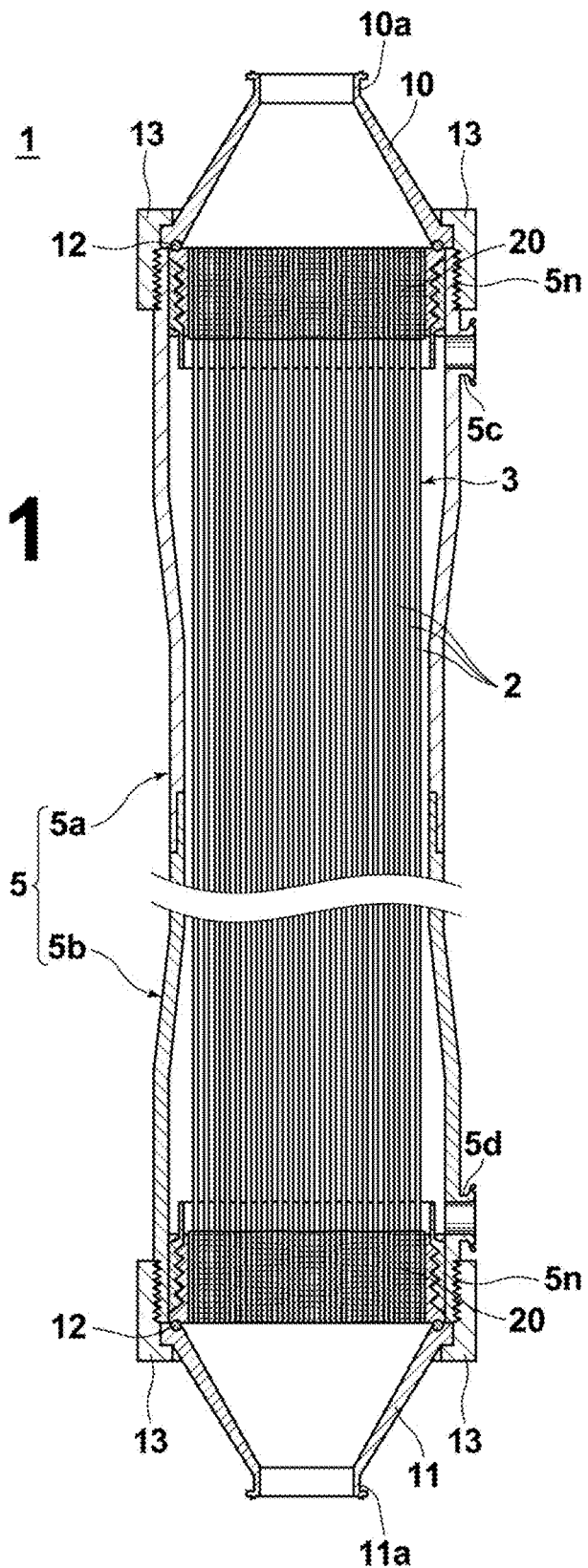
FIG. 1 is a side-view cross section of a hollow fiber membrane module according to an embodiment of the present disclosure.
Figure 2:
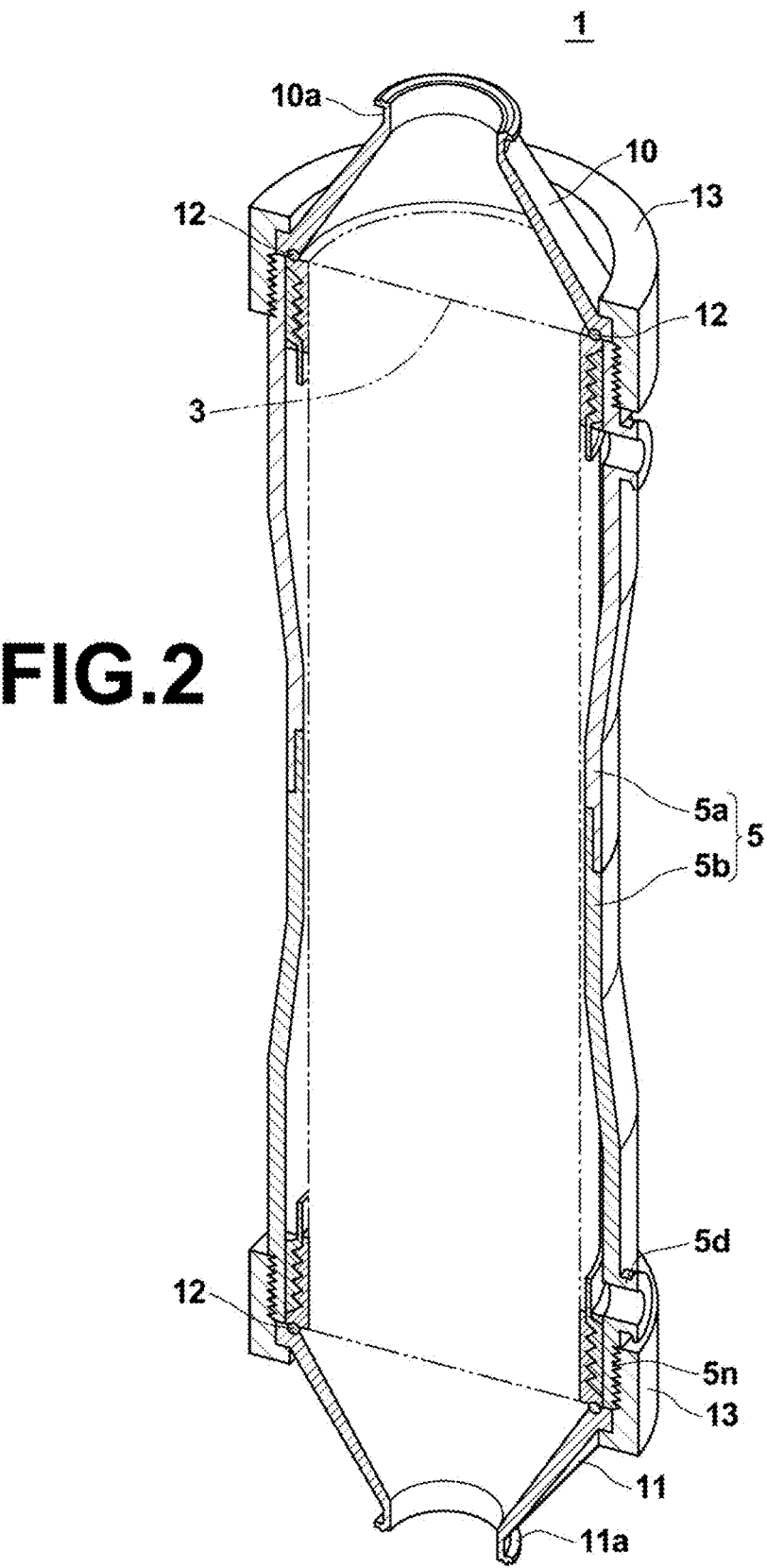
FIG. 2 is a partially-cut perspective view of the hollow fiber membrane module.

FIG. 1 and FIG. 2 are a side-view cross section and a partially-cut perspective view of a hollow fiber membrane module 1 according to the present embodiment, respectively. As illustrated in these diagrams, the hollow fiber membrane module 1 according to the present embodiment includes a hollow fiber membrane bundle 3 composed of plural hollow fiber membranes 2 bundled together, and a tubular housing case 5 that houses this hollow fiber membrane bundle 3, and which is for example in a cylindrical shape. FIG. 2 illustrates a state in which the hollow fiber membrane module 1 is cut at a plane including the tube axis central axis) of the housing case 5. Here, the hollow fiber membrane bundle 3 in the state of being cut in half is indicated by a two dot dashed line.

Caps 10, 11 for connecting piping, in which tubular channels 10a, 11a to which piping is to be connected are formed, are arranged at openings of both ends of the housing case 5, respectively. These caps 10, 11 are fixedly attached to the housing case 5 by nuts 13, respectively. The nuts 13 are screwed onto male screws 5n formed on an outer circumferential surface at both ends of the housing case 5. When these nuts 13 are tightened, O-rings 12 arranged between the caps 10, 11 and the housing case 5 liquid-tightly seal the inside and the outside of the O-rings 12 against each other. In other words, the internal space defined by the housing case 5 and the caps 10, 11 and the external space of the housing case 5 and the caps 10, 11 are liquid-tightly sealed against each other. The structure of a part in which the O-ring 12 is arranged will be described later in detail.

Further, nozzles 5c, 5d are formed at the vicinities of the two ends of the housing case 5, respectively. A pair of these nozzles 5c, 5d is provided in such a manner to project in a direction orthogonal to the longitudinal direction of the housing case 5, and each of the nozzles 5c, 5d communicates with the inside of the housing case 5, and passes fluid through.

As illustrated in FIG. 1, plural hollow fiber membranes 2, each having an opening, are arranged at both end surfaces of the hollow fiber membrane bundle 3, and a bond portion 20 is formed by filling a space between the hollow fiber membranes 2 with potting material.

In the aforementioned structure, fluid that has flowed in through the tubular channels 10a, 11a of the caps 10, 11 passes through only a hollow portion in each of the hollow fiber membranes 2 without leaking to an area between the hollow fiber membranes 2, because the bond portion 20 is formed. Further, fluid that has permeated out from each of the hollow fiber membranes 2 through the outer surface thereof between the two bond portions 20 flows out from the nozzles 5c, 5d, or fluid that has flowed in from the nozzles 5c, 5d permeates into each of the hollow fiber membranes 2 through the outer surface thereof between the two bond portions 20. The fluid that has passed through a hollow portion of each of the hollow fiber membranes 2 flows out from the tubular channels 10a, 11a of the caps 10, 11.

As the hollow fiber membrane 2, a microfiltration membrane, an ultrafiltration membrane or the like may be used. The material of the hollow fiber membrane is not particularly limited. Examples of the material are polysulfones, polyethersulfones, polyacrylonitriles, polyimides, polyetherimides, polyamides, polyetherketones, polyether ether ketones, polyethylenes, polypropylene, poly(4-methyl-1-pentene), ethylene-vinyl alcohol copolymers, cellulose, cellulose acetate, polyvinylidene fluoride, ethylene-tetrafluoroethylene copolymers, polytetrafluoroethylene and the like, and composite materials thereof may also be used.

The inner diameter of the hollow fiber membrane 2 is from 50 µm to 3000 µm, and desirably from 500 µm to 2000 µm. In the case that the inner diameter is small, a pressure drop becomes large, and that has an adverse effect on filtration. Therefore, it is desirable that the inner diameter of the hollow fiber membrane 2 is 50 µm or greater. Further, in the case that the inner diameter is large, it becomes difficult to maintain the shape of a membrane during spinning. Therefore, it is desirable that the inner diameter is 3000 µm or less. Further, it is desirable that an average pore diameter on the inner surface of the hollow fiber membrane 2 is from 1 to 50 µm. It is desirable that a blocking pore diameter is from 0.1 to 1 µm.

Meanwhile, the number of hollow fiber membranes 2 in the hollow fiber membrane bundle 3 may be about 2500 in the case that the inner diameter of the housing case 5 is 150 mm, and about 5000 in the case that the inner diameter of the housing case 5 is 250 mm.

Here, resin impregnation portions, which are formed by impregnating resin into the outer surface of each of the hollow fiber membranes 2, are provided at both ends of each of the hollow fiber membranes 2. When such resin impregnation portions are provided, it is possible to prevent obstruction of the hollow portion of the hollow fiber membrane 2, caused by penetration of potting material into the hollow portion through small pores of the hollow fiber membrane 2. Further, while filtration or washing by backwash is performed in the hollow fiber membrane module 1, it is possible to prevent damage to a portion of the hollow fiber membrane 2 in the vicinity of a boundary between the bond portion 20 and a space present between the two bond portions 20, caused by contact of an edge of the bond portion 20 with the outer surface of the hollow fiber membrane 2 in the vicinity of the portion.

Next, the structure of the housing case 5 will be described in detail also with reference to FIG. 3. The housing case 5 in the present embodiment is composed of a first formation member 5a and a second formation member 5b, both of which are formed of synthetic resin, for example. The first formation member 5a is integratedly formed with the nozzle 5c, which is one of the nozzles, and constitutes an end of the housing case (the upper end in FIG. 1 and FIG. 2). The second formation member 5b is integratedly formed with the nozzle 5d, which is the other nozzle, and constitutes the other end of the housing case 5 (the lower end in FIG. 1 and FIG. 2).

Figure 3:
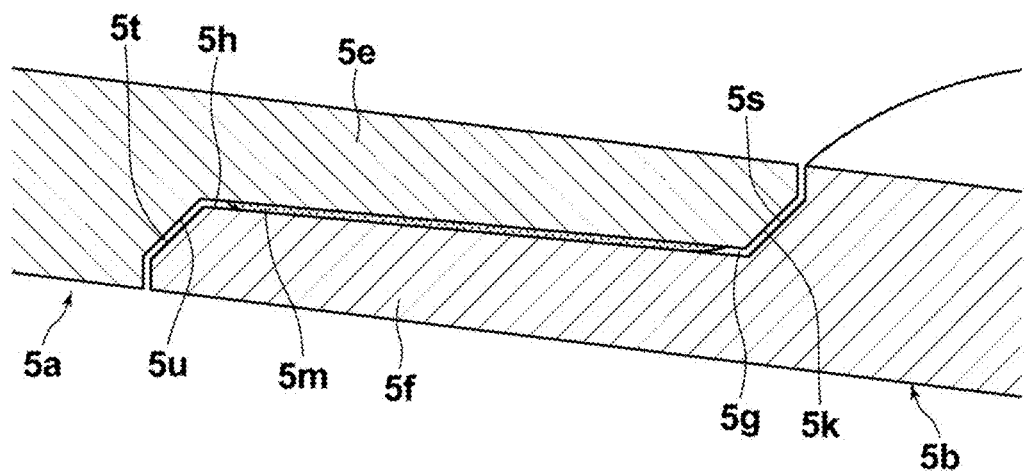
FIG. 3 is a partially-cut perspective view illustrating a junction part of a first formation member and a second formation member in the hollow fiber membrane module.

FIG. 3 is a cross section illustrating the shape of a junction part of the first formation member 5a and the second formation member 5b. As illustrated in FIG. 3, the first formation member 5a includes a junction part 5e the thickness of which is slightly less than ½ of the thickness of the other cylindrical part. Similarly, the second formation member 5b includes a junction part 5f the thickness of which is slightly less than ½ of the thickness of the other cylindrical part. The junction part 5e and the junction part 5f are combined together in such a manner that they are located toward the outer circumferential surface and the inner circumferential surface of the cylindrical housing case 5, respectively, and in that state, they are joined together.

Both of the junction parts 5e, 5f are joined together at a middle position in the direction of the tube axis of the housing case 5 (the vertical direction in FIG. 1). The term "middle position" means a position between the two ends of the housing case 5, and is not particularly limited. Here, the two junction parts 5e, 5f are joined together ordinarily in a state in which a center position of the two junction parts 5e, 5f in the direction of the tube axis coincides with a center position of the housing case 5 in the direction of the tube axis. Here, the length of the junction parts 5e, 5f in the direction of the tube axis is generally about from 25 to 30 mm in the case that the length of the housing case 5 is 800 mm and the inner diameter of the housing case 5 is about 230 mm, for example.

The two junction parts 5e, 5f are joined together by using, for example, a solvent-type adhesive, i.e., a type of adhesive in which synthetic resin similar to synthetic resin constituting the junction parts 5e, 5f is dissolved in solvent. More specifically, an inner circumferential surface 5g of the junction part 5e, which faces the junction part 5f, and an outer circumferential surface 5h of the junction part 5f, which faces the junction part 5e, are joined together. In FIG. 3, a bond area is indicated as an area 5m with dots. This bond area 5m is composed of adhesive and a part of the junction parts 5e, 5f melted by the adhesive. The structure in which the junction part 5e and the junction part 5f are combined together in such a manner that they are located toward the outer circumferential surface and the inner circumferential surface of the housing case 5, respectively, and joined together, as described above, has sufficiently high junction strength.

Here, the junction between the two junction parts 5e, 5f is not limited to junction by using solvent-type adhesive, and other types of adhesive may be used. Further, a method such as ultrasonic welding, which does not use adhesive, may be used.

Here, a leading end portion of the junction part 5e, which is one of the junction parts, has a shape having a beveled surface 5k diagonally facing an outer circumferential surface 5h of the junction part 5f, to which the junction part 5e is to be joined. This expression "diagonally facing" means that the leading end portion is inclined with respect to a direction in which the outer circumferential surface 5h extends in the longitudinal direction of the housing case 5 in the case that the cross sectional shape of the junction parts 5e and 5f is considered. When such a beveled surface 5k is provided, each of formation stress remaining after formation of synthetic resin into the junction part 5e and junction stress induced in the case that the junction part 5e is joined with the junction part 5f is distributed from a position to two positions, compared with a case in which no beveled surface is formed. Therefore, it is possible to maintain the strength of the junction part 5e at a high level.

In the present embodiment, a beveled surface 5s facing the beveled surface 5k is formed also on the junction part 5f. Further, a beveled surface 5t similar to the beveled surface 5k is formed also at a leading end portion of the junction part 5f, and a beveled surface 5u facing the beveled surface 5t is formed also in the junction part 5e so as to correspond to the beveled surface 5t. Since the beveled surfaces 5s, 5t and 5u are formed, it is possible to achieve an effect that the strength of the junction parts 5e, 5f is maintainable at a high level.

When the housing case 5 is composed of two members of the first formation member 5a, which is integratedly formed with the nozzle 5c, and the second formation member 5b, which is integratedly formed with the nozzle 5d, as described above, it is possible to achieve effects that equipment for producing the housing case 5 is simplified and an error in the size of the whole housing case after formation by joining members together is suppressed, compared with a conventional method in which the housing case 5 is composed of three members.

Next, with reference to FIG. 4 through FIG. 8, the structure of a part in which the caps 10, ii are fixedly attached to the housing case 5 will be described in detail. Here, the structure of a fixed attachment part between the cap 10, which is one of the caps, and the housing case 5 will be described. Since the structure of the other cap 11 side is the same, explanation of the structure will be omitted.

At an end portion of the first formation member 5a constituting the housing case 5 (an end portion opposite to the second formation member 5b), a rectifier tube 30, which is formed of synthetic resin for example, is joined to the inner circumferential surface of the first formation member 5a. The rectifier tube 30 is joined, for example, by bond using adhesive. A leading end of this rectifier tube 30 toward the inner direction of the first formation member 5a, i.e., toward the center of the housing case 5 in the direction of the tube axis is an extension portion 30a facing the inner end of the nozzle 5c.

On the inner circumferential surface of the rectifier tube 30, ring-shaped recess portions and ring-shaped protrusion portions are repeatedly provided in the direction of the tube axis of the housing case 5. An example of the cross-sectional shape of these ring-shaped recess portions and ring-shaped protrusion portions is a saw-toothed shape. Further, the potting material 31 is arranged on these ring-shaped recess portions and ring-shaped protrusion portions in such a manner to fill them. As described already, the potting material 31 bonds and fixes the plural hollow fiber membranes 2 together at each end of the hollow fiber membranes 2, and constitutes the bond portion 20, illustrated in FIG. 1.

When the potting material 31 is arranged on the ring-shaped recess portions and ring-shaped protrusion portions in such a manner to fill them, it is possible to prevent the potting material 31 from coming off from the housing case 5 in the direction of the tube axis of the housing case. More efficient effect is achievable if matte finish is applied to the surface of the ring-shaped recess portions and ring-shaped protrusion portions in advance.

In the present embodiment, the rectifier tube 30 has been joined to the inner circumferential surface of the housing case 5 (more specifically, the first formation member 5a). Therefore, the potting material 31 fills a space reaching the inner circumferential surface of the rectifier tube 30. In the present specification, a case in which the potting material 31 fills a space reaching the inner circumferential surface of some member fixed to the inner circumferential surface of the housing case 5, and a case in which the potting material 31 fills a space directly reaching the inner circumferential surface of the housing case 5 without such a member provided will be similarly referred to a case in which "the potting material fills a space reaching the inner circumferential surface of the housing case".

Although the ring-shaped recess portions and the ring-shaped protrusion portions are provided on the inner circumferential surface of the rectifier tube 30 in the present embodiment, the ring-shaped recess portions and the ring-shaped protrusion portions may be provided on the inner circumferential surface of the housing case 5 without providing a member, such as the rectifier tube 30. In the present specification, both of the cases will be referred to a case in which "on the inner circumferential surface of the housing case, ring-shaped recess portions and ring-shaped protrusion portions are repeatedly provided in the direction of the tube axis of the housing case".

Figure 4:
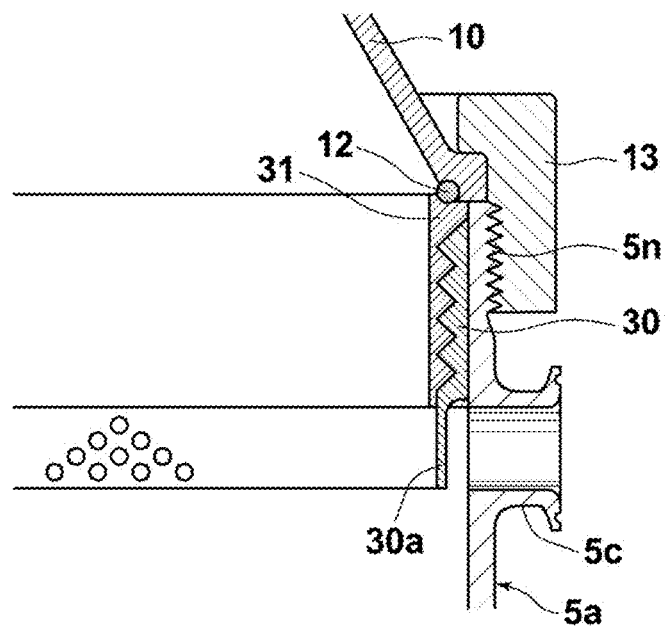
FIG. 4 is a side-view cross section illustrating a part in which a cap and a housing case in the hollow fiber membrane module are fixedly attached to each other.
Figure 5:
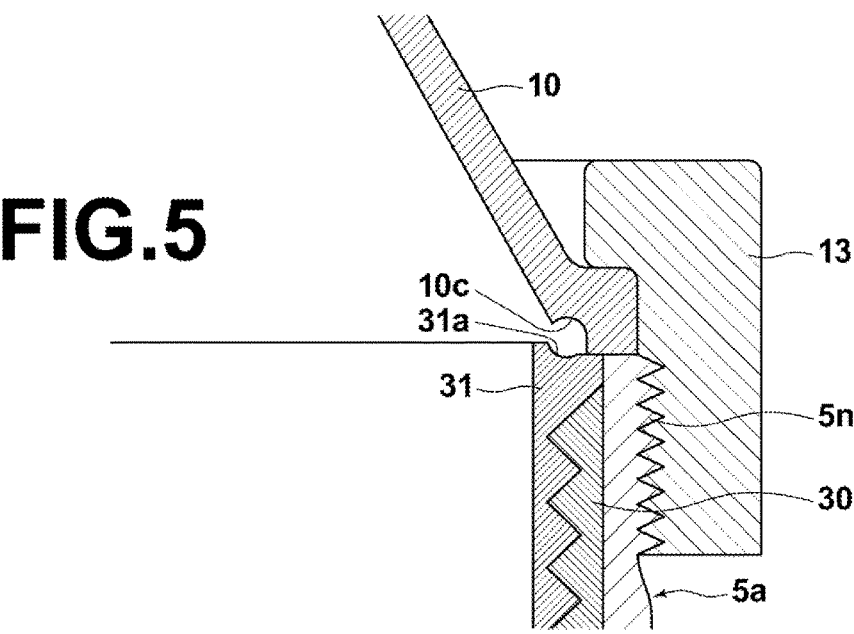
FIG. 5 is an enlarged side-view cross section illustrating the structure of FIG. 4.

As illustrated in an enlarged diagram of FIG. 5, a ring-shaped groove 31a is formed along the whole circumference of an end surface of the potting material 31 facing the cap 10. Further, a ring-shaped groove 10c facing the ring-shaped groove 31a is formed on a surface of the cap 10 facing the end surface of the potting material 31. Further, as illustrated in FIG. 4, an O-ring 12 is housed between the ring-shaped groove 31a and the ring-shaped groove 10c. The cross-sectional shape of each of the ring-shaped groove 31a and the ring-shaped groove 10c forms a part of an arc similar to the outer shape of the O-ring 12. The O-ring 12 is closely held by the potting material 31 and the cap 10, and tightly housed in the ring-shaped groove 31a and the ring-shaped groove 10c.

Figure 6A:
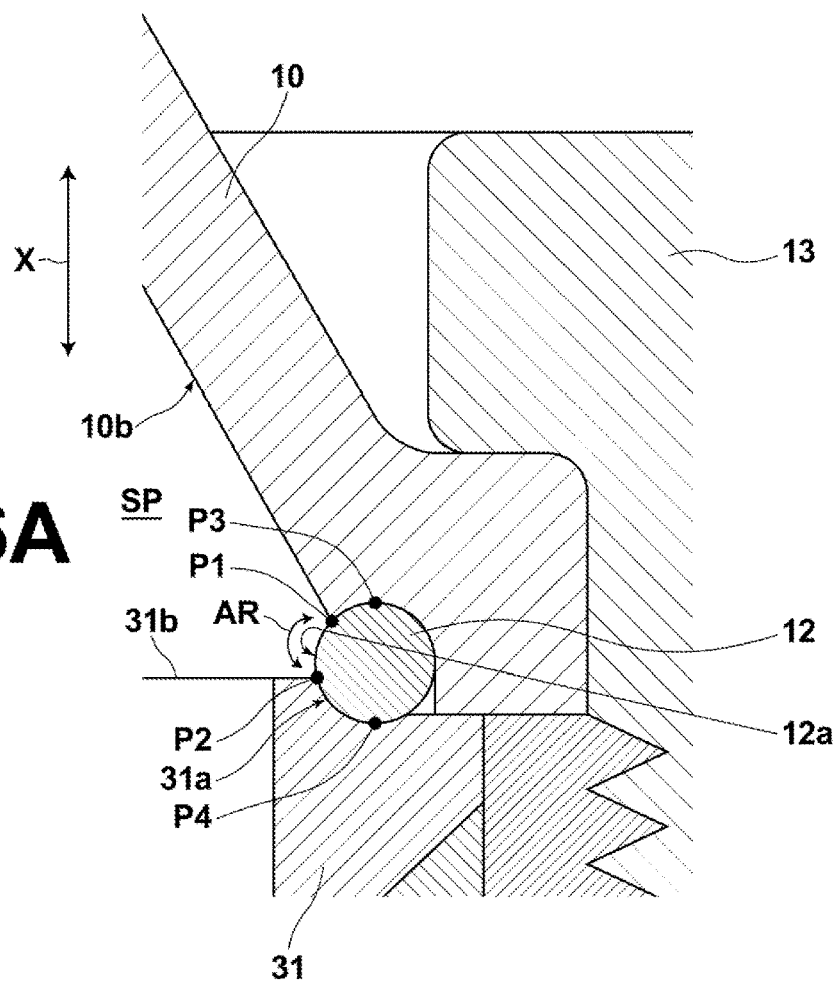
FIG. 6A is a diagram illustrating the state of an O-ring held between potting material and a cap.
Figure 6B:
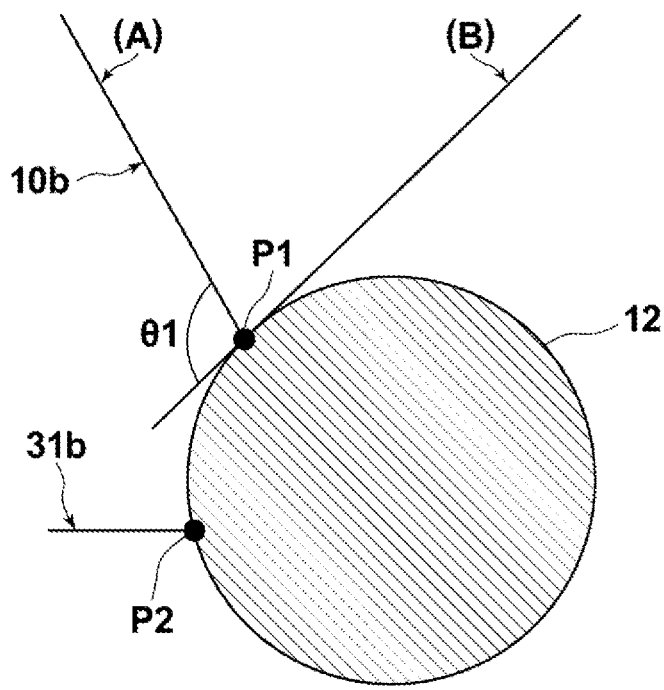
FIG. 6B illustrates an angle formed by a straight line on the inner circumferential surface of the cap and a tangent to the O-ring passing though a first contact point.
Figure 6C:
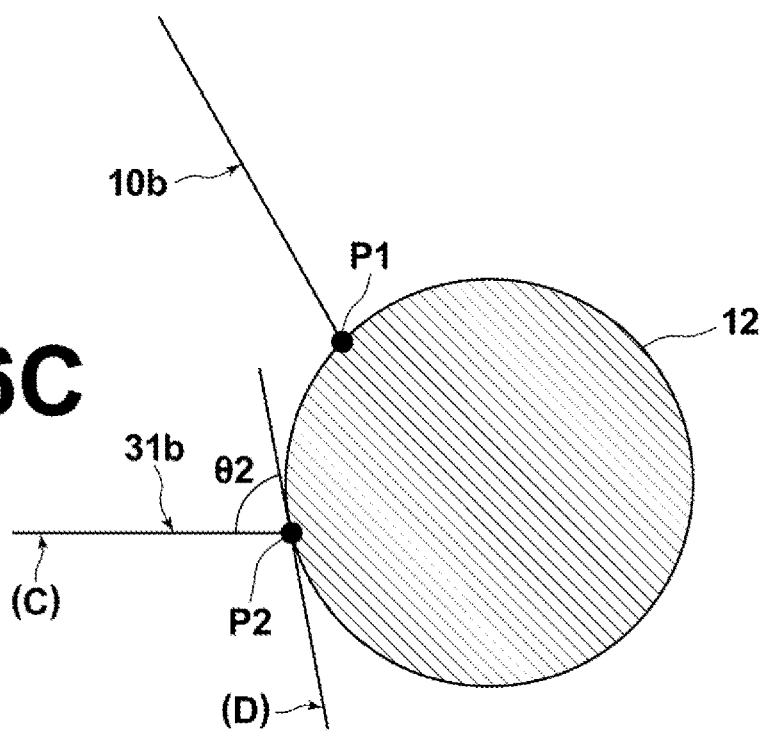
FIG. 6C illustrates an angle formed by a straight on the end surface of the potting material facing the cap and a tangent to the O-ring passing though a second contact point.

FIG. 6A is a diagram illustrating a state, more in detail, in which the O-ring 12 is closely held by the potting material 31 and the cap 10.

In the present embodiment, as illustrated in FIG. 6A, the module is structured so that a whole area of the O-ring 12 (an area in a range indicated by arrow AR) between first contact point P1 and second contact point P2 is exposed when the area is viewed from a central axis of the O-ring 12. First contact point P1 is a point of contact between the O-ring 12 and the cap 10, and faces inner cavity SP, and second contact point P2 is a point of contact between the O-ring 12 and the potting material 31, and faces inner cavity SP.

Figure 7:
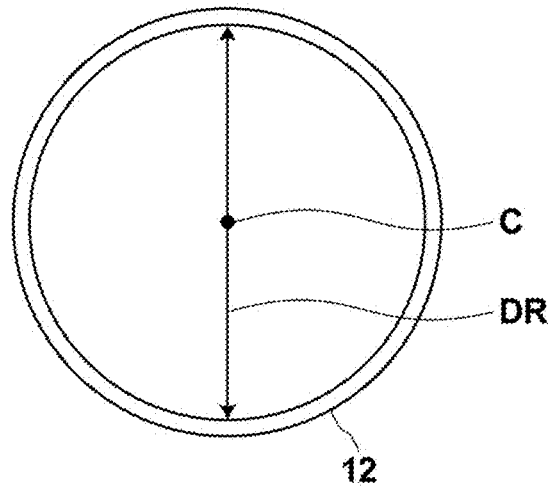
FIG. 7 is a diagram for explaining the center of the inner diameter of the O-ring.

Here, inner cavity SP is a space defined by an end surface 31b of the potting material 31 facing the cap 10, an inner circumferential surface 12a of the O-ring 12 and an inner circumferential surface 10b of the cap 10. Further, the central axis of the O-ring 12 that passes through the center of the ring shape of the O-ring 12 is a straight line that passes through the center of the inner diameter of the O-ring 12 and is perpendicular to the direction of the inner diameter. Further, the expression "viewed from a central axis of the O-ring 12" means being viewed in the direction of the inner diameter from an arbitrary position on the central axis. The center of the inner diameter of the O-ring 12 is center C of inner diameter DR of the O-ring 12, as illustrated in FIG. 7.

The structure as described above, in which the whole area of the O-ring 12 between first contact point P1 and second contact point P2 is exposed when the area is viewed from the central axis of the O-ring 12 is, for example, structure in which first contact point P1 and second contact point P2 satisfy the following conditions. First contact point P1 is a contact point on the inner circumferential surface of the O-ring 12, and the point is located, with respect to the longitudinal direction of the housing case 5 (X-direction illustrated in FIG. 6A), closest to the potting material 31 on the inner circumferential surface 10b of the cap 10 facing inner cavity SP. Further, second contact point P2 is a contact point on the inner circumferential surface of the O-ring 12, and the point is located, with respect to the longitudinal direction of the housing case 5 (X-direction illustrated in FIG. 6A), closest to the cap 10 on the end surface of the potting material 31.

It is desirable that first contact point P1 is located closer to the potting material 31 than point P3, which is located furthest toward the cap 10 in the direction of the central axis of the O-ring 12 on the inner circumferential surface of the O-ring 12, Further, it is desirable that second contact point P2 is located closer to the cap 10 than point P4, which is located furthest toward the potting material 31 in the direction of the central axis of the O-ring 12 on the inner circumferential surface of the O-ring 12.

Figure 8:
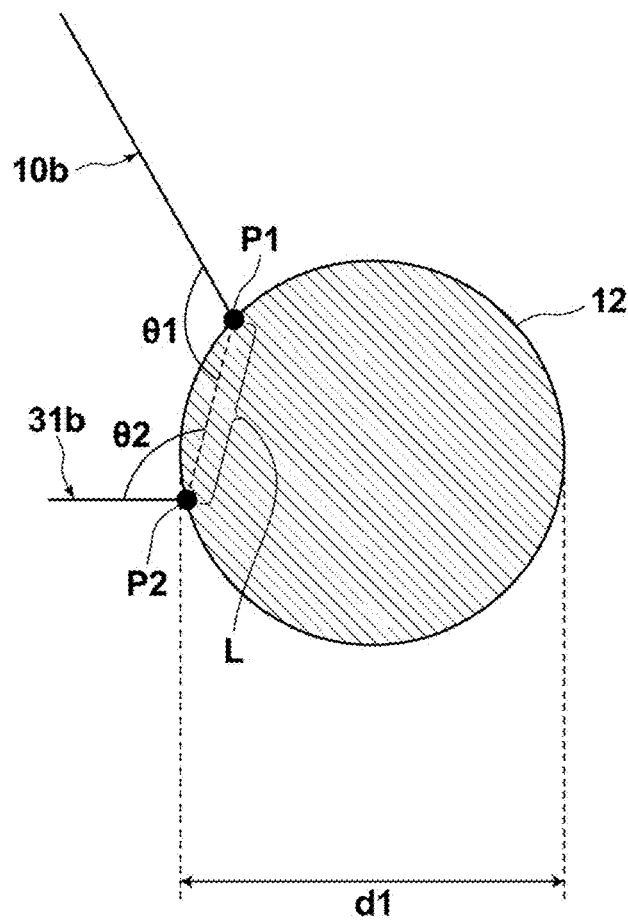
FIG. 8 is an enlarged diagram of the vicinity of a first contact point and a second contact point.

Further, FIG. 8 is an enlarged diagram of the vicinity of first contact point P1 and second contact point P2 as described above. In the present embodiment, the module is structured in such a manner that angle θ1 formed by a straight line connecting first contact point P1 and second contact point P2 and the inner circumferential surface 10b of the cap 10 is an obtuse angle on a cross section parallel to the longitudinal direction of the housing case 5 (X-direction illustrated in FIG. 6A). Further, the module is structured in such a manner that angle θ2 formed by the straight line and the end surface 31b of the potting material 31 is an obtuse angle. Here, the module may be structured in such a manner that only one of angle θ1 and angle θ2 is an obtuse angle.

Further, it is desirable that distance L between first contact point P1 and second contact point P2 is 15% or more and 50% or less of diameter d1 of a cross section of the O-ring 12.

In the state in which the O-ring 12 is arranged as described above, the nut 13 is screwed onto the male screw 5n of the first formation member 5a, as described already. When the nut 13 is tightened, the O-ring 12 liquid-tightly seals the inside and the outside of the O-ring 12 against each other. In other words, an internal space defined by the first formation member 5a, which constitutes the housing case 5, and the cap 10 and an external space of the first formation member 5a and the cap 10 are liquid-tightly sealed against each other.

When the module is structured in such a manner that the whole area of the O-ring 12 (an area in a range indicated by arrow AR) between first contact point P1, which is a point of contact between the O-ring 12 and the cap 10, and second contact point P2, which is a point of contact between the O-ring 12 and the potting material 31, is exposed when the area is viewed from the central axis of the O-ring 12, it is possible to achieve an effect of reducing an area formed between the cap 10 and the O-ring 12 and an area formed between the potting material 31 and the O-ring 12, in which fluid stagnates. Here, if the area in which the liquid stagnates becomes large, a minute solid component contained in water to be processed remains in the area. Therefore, the sanitary characteristics of the hollow fiber membrane module 1 are damaged.

Further, in the present embodiment, it is possible to further reduce the area in which fluid stagnates by structuring the module in such a manner that an angle formed by a straight line connecting first contact point P1 and second contact point P2 and at least one of the inner circumferential surface of the cap 10 and the end surface of the potting material 31 is an obtuse angle on a cross section passing through the central axis of the housing case 5.

Further, in the present embodiment, it is possible to further reduce the area in which fluid stagnates, and to improve the seal characteristics by the O-ring 12 by structuring the module in such a manner that a distance between first contact point P1 and second contact point P2 is 15% or more and 50% or less of the diameter of a cross section of the O-ring 12.

Further, in the present embodiment, it is possible to improve the seal characteristics by the O-ring 12 by structuring the module in such a manner that ring-shaped grooves 31a, 10c are formed on the potting material 31 and the cap 10, respectively, and the O-ring 12 is housed between the ring-shaped grooves 31a, 10c, compared with a case in which the O-ring 12 is arranged between two flat surfaces, for example, as disclosed in Patent Document 1, as described already.

In contrast to the structure disclosed in Patent Document 1, the module of the present embodiment is structured in such a manner that an angle θ1 is formed by a straight line (A) on the inner circumferential surface 10b of the cap 10 and a tangent (B) to the O-ring 12 that passes through first contact point P1 exceeds 0 degree on a cross section passing through the central axis of the housing case 5. See FIG. 6B. Further, the module is structured in such a manner that an angle θ2 is formed by a straight line (C) on the end surface of the potting material 31 facing the cap 10 and a tangent (D) to the O-ring 12 that passes through second contact point P2 exceeds 0 degree on the cross section passing through the central axis of the housing case 5. See FIG. 6C. It is possible to reduce an area in which fluid stagnates by structuring the module in this manner, compared with the structure disclosed in Patent Document 1.

Especially, in the present embodiment, the cross-sectional shape of each of the ring-shaped groove 31a and the ring-shaped groove 10c forms a part of an arc similar to the outer shape of the O-ring 12. As a result, the O-ring 12 is tightly housed in the ring-shaped groove 31a and the ring-shaped groove 10c. Therefore, the possibility of generation of a minute gap, as described above, is extremely low. Hence, the hollow fiber membrane module 1 of the present embodiment has sufficiently high sanitary characteristics.

Figure 9:
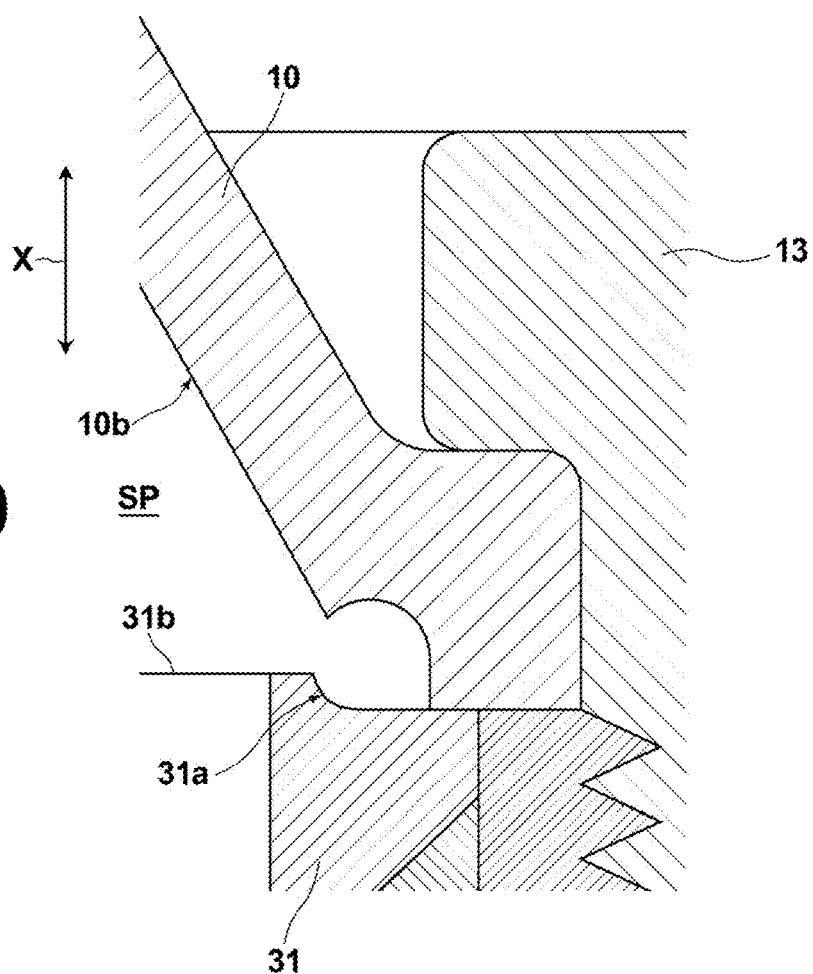
FIG. 9 is a diagram illustrating a modification example of a hollow fiber membrane module according to an embodiment of the present disclosure.

Here, the ring-shaped groove 31a formed on the potting material 31 does not necessarily include a circular recess part as illustrated in See FIG. 6A. As illustrated in FIG. 9, the ring-shaped groove 31a may be formed by a flat surface and an arc-shaped curved surface that does not form a recess from the flat surface toward the potting material 31. When the ring-shaped groove 31a is structured in this manner, it is possible to compress the O-ring 12 by the flat surface. Therefore, it is possible to improve the liquid-tight characteristics.

In the present embodiment, the inner surface of the cap 10 is a tapered surface in which the diameter of the inner surface gradually increases as approaching the first formation member 5a. Further, this tapered surface and the end surface of the potting material 31 are connected to each other through only a surface of the O-ring 12 therebetween. In other words, neither a recess part nor a gap is present between the inner surface of the cap 10 and the end surface of the potting material 31. Therefore, in the case that water to be processed is filtered by using the hollow fiber membrane module 1, especially when the water to be processed is introduced from the cap 10 side and filtrate is discharged from the nozzle 5c, it is possible to prevent a solid component contained in the water to be processed from entering and remaining in the recess part or the gap.

Figure 10:
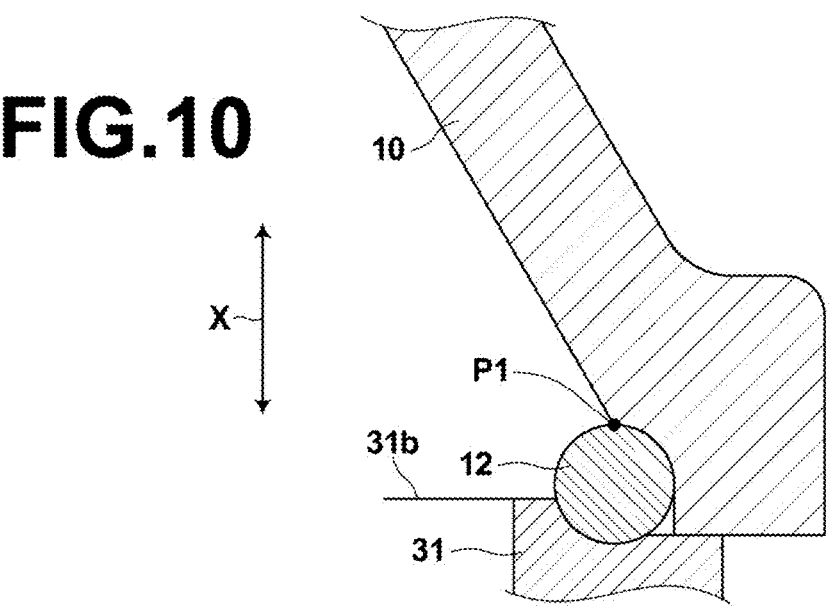
FIG. 10 is a diagram illustrating another example of a ring-shaped groove formed on the potting material.
Figure 11:
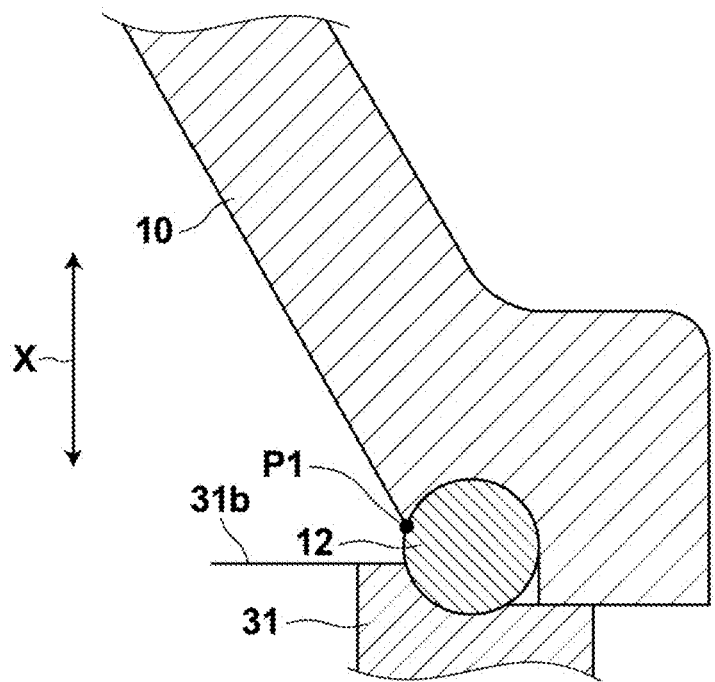
FIG. 11 is a diagram illustrating a modification example of a hollow fiber membrane module according to an embodiment of the present disclosure.

The present disclosure is not limited to the structure illustrated in FIG. 6A. For example, as illustrated in FIG. 10, the position of first contact point P1 may be the position of point P3, illustrated in FIG. 6A. Alternatively, as illustrated in FIG. 11, the position of first contact point P1 may be located closer to the potting material 31 than the position illustrated in FIG. 6A.

Figure 12:
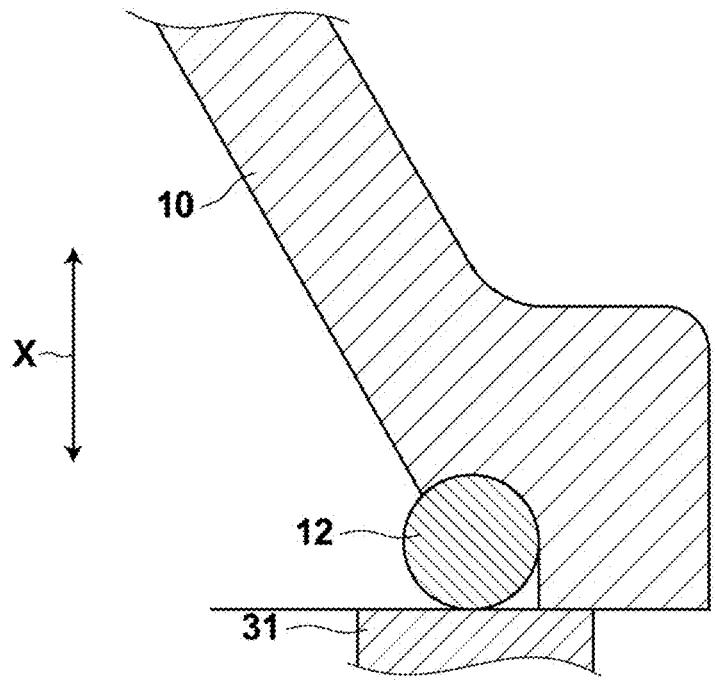
FIG. 12 is a diagram illustrating a modification example of a hollow fiber membrane module according to an embodiment of the present disclosure.
Figure 13:
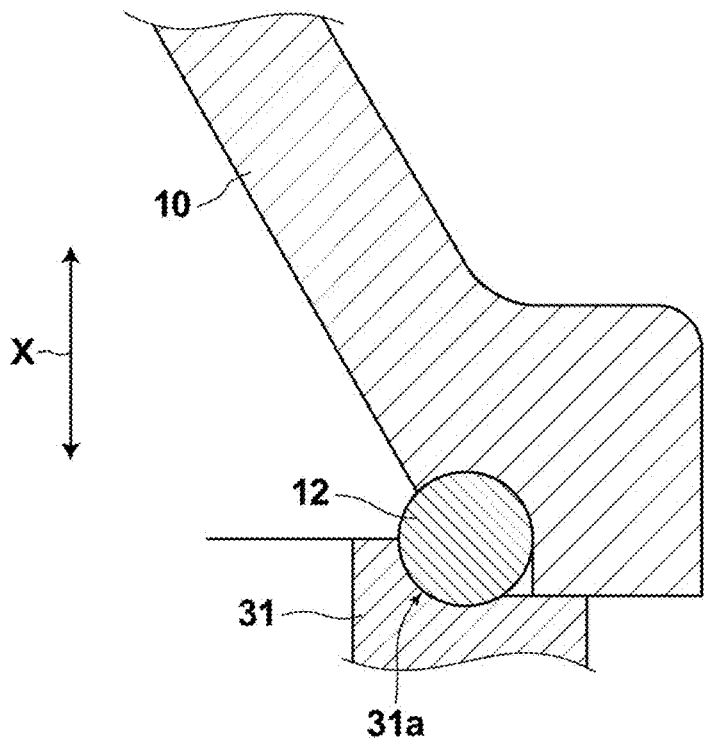
FIG. 13 is a diagram illustrating a modification example of a hollow fiber membrane module according to an embodiment of the present disclosure.

Further, as illustrated in FIG. 12, structure in which no ring-shaped groove 31a is provided on the potting material 31 may be adoptable. Further, the depth of the ring-shaped groove 31a may be less than the depth of the ring-shaped groove 31a illustrated in FIG. 6A. On the contrary, as illustrated in FIG. 13, the depth of the ring-shaped groove 31a may be more than the depth of the ring-shaped groove 31a illustrated in FIG. 6A.

Figure 14:
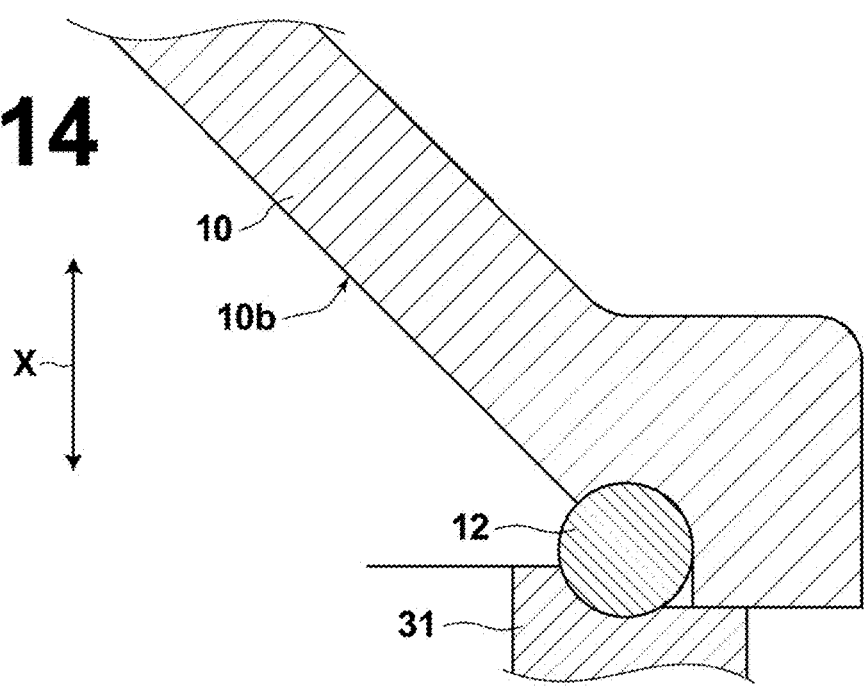
FIG. 14 is a diagram illustrating a modification example of a hollow fiber membrane module according to an embodiment of the present disclosure.

Further, as illustrated in FIG. 14, the inclination of the inner circumferential surface 10b of the cap 10 may be less steep than the inclination of the inner circumferential surface 10b of the cap 10 illustrated in FIG. 6A. On the contrary, the inclination of the inner circumferential surface 10b of the cap 10 may be steeper than the inclination of the inner circumferential surface 10b of the cap 10 illustrated in FIG. 6A. Further, as illustrated in FIG. 15, the shape of the inner circumferential surface 10b of the cap 10 may be convex relative to the shape of the inner circumferential surface 10b of the cap 10 illustrated in FIG. 6A. Alternatively, as illustrated in FIG. 16, the shape of the inner circumferential surface 10b of the cap 10 may be concave.

Here, as the material of the potting material 31, high molecular material, such as epoxy resin, vinyl ester resin, urethane resin, unsaturated polyester resin, olefinic polymer, silicone resin, and fluorine-containing resin, is desirable. The material of the potting material 31 may be one of these high molecular materials, or a combination of plural high molecular materials thereof. It is necessary that the potting material 31 has pressure resistance that can tolerate a differential pressure between a primary side and a secondary side caused by pressurization during filtration. Therefore, the potting material 31 needs to have appropriate hardness.

Next, with reference to FIG. 17 and FIG. 18, the shape of the nozzle 5c provided in the first formation member 5a will be described. Since the shape of the nozzle 5d provided in the second formation member 5b is the same as the shape of the nozzle 5c, the shape of the nozzle 5c will be described here, and explanation about the nozzle 5d will be omitted.

The nozzle 5c is a trumpet-shaped nozzle including a straight tube part, through which fluid passes, and a flange-shaped part 5q, which is formed on the leading end of this straight tube part. Further, the inner surface 5p of the nozzle 5c has a shape smoothly continuing from the inner circumferential surface of the straight tube part to the outer surface of the flange-shaped part 5q (the upper surface in FIG. 17). Further, a ring-shaped groove 5r that houses, for example, an O-ring (not illustrated), as a gasket, is formed on the outer surface of the flange-shaped part 5q.

As illustrated in FIG. 18, piping 40 is connected to the nozzle 5c, which is structured as described above. This piping 40 also includes a flange-shaped part 40a in a similar manner to the nozzle 5c. In the case that the piping 40 is connected to the nozzle 5c, the flange-shaped part 40a and the flange-shaped part 5q are caused to abut on each other through the O-ring therebetween, and bound together by a known sanitary clamp 41. As a result, the nozzle 5c and the piping 40 are connected to each other in a communicatable manner with each other.

The sanitary clamp 41 includes two holding units 41b, 41c, which are coupled together by a coupling unit 41a in an openable and closable state with respect to each other, fastening units 41d, 41f, which are formed continuously from the leading end portions of the holding units 41b, 41c, respectively, and a fastening bolt 41g, which is screwable into female screws formed on the fastening units 41d, 41f, which are not illustrated. The holding units 41b, 41c include, on their inner circumferential surfaces, inner circumferential grooves, respectively, that hold peripheral portions of the flange-shaped part 40a and the flange-shaped part 5q abutted on each other, and which are not illustrated.

In the case that the piping 40 is connected to the nozzle 5c, first, the holding units 41b, 41c are set in an open state. Then, the holding units 41b, 41c are closed in such a manner that the peripheral portions of the flange-shaped part 40a and the flange-shaped part 5q enter the inner circumferential grooves on the holding units 41b, 41c, respectively. Next, the flange-shaped part 40a and the flange-shaped part 5q are pressed hard to each other by tightening the fastening bolt 41g screwed into the female screws of the fastening units 41d, 41f. As a result, the piping 40 is connected to the nozzle 5c in a communicatable manner with the nozzle 5c.

As described above, the inner circumferential surface 5p of the nozzle 5c has a shape smoothly continuing from the inner circumferential surface of the straight tube part to the outer surface of the flange-shaped part 5q. Further, the nozzle 5c in that shape is connected to the piping 40. Specifically, in connecting the piping 40, no uneven part is formed on the inner surface of the nozzle 5c and the piping 40, because no additional piping element is combined. Further, it is not necessary to particularly touch the inner surface of the nozzle 5c and the piping 40 to perform this connection. Therefore, the nozzle 5c and the piping 40 are connected to each other while the nozzle 5c and the piping 40 maintain high sanitary characteristics.

Figure 19:
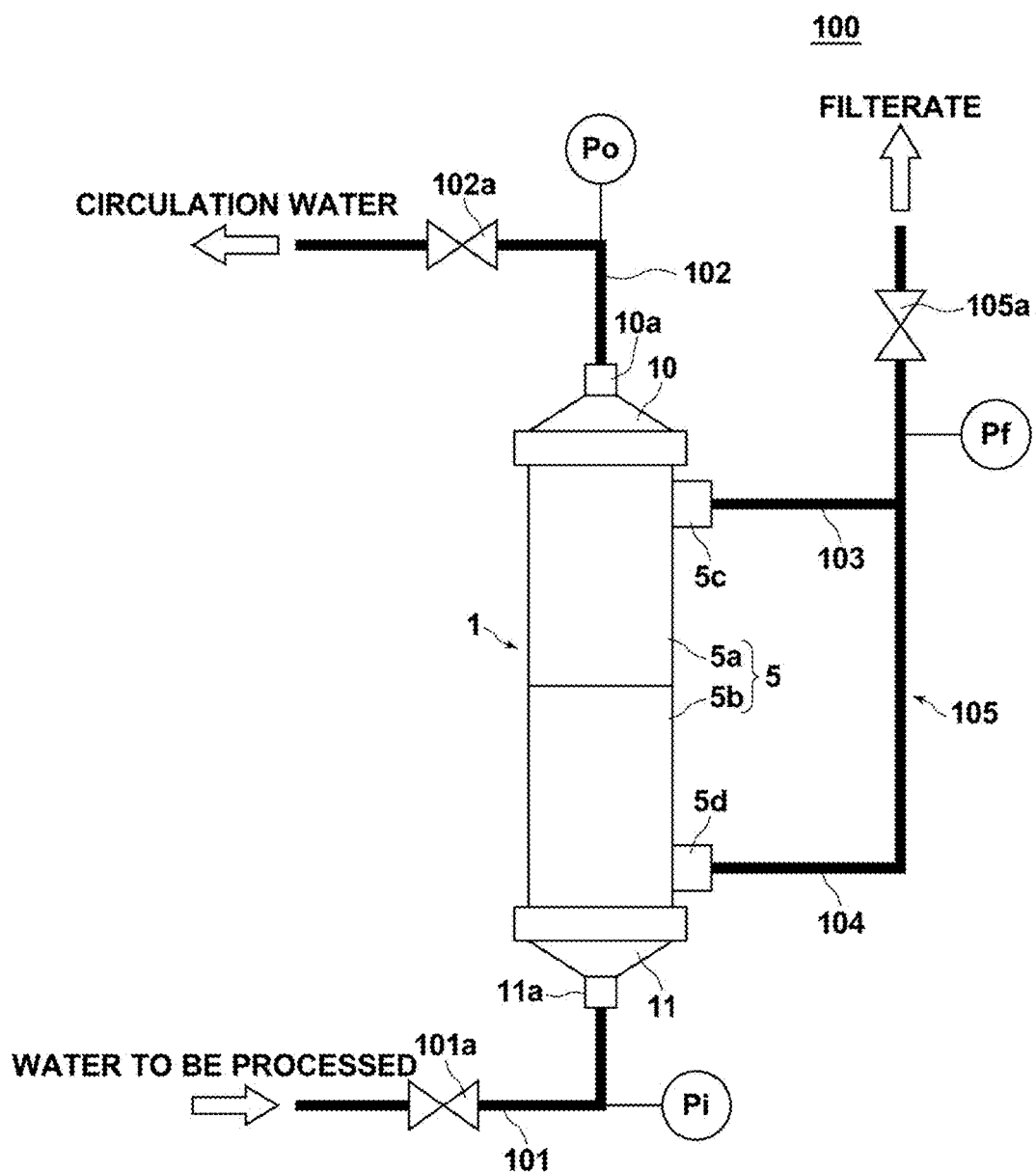
FIG. 19 is a schematic diagram illustrating the configuration of a filtration apparatus using a hollow fiber membrane module according to an embodiment of the present disclosure.

Next, with reference to FIG. 19, an example of mode in which the hollow fiber membrane module 1 according to the present embodiment is installed in a filtration apparatus 100 will be described. Further, a filtration method using the hollow fiber membrane module 1 according to the present embodiment will be described. Here, it is assumed that this filtration apparatus 100 uses a cross-flow filtration method in inside-out filtration, as an example.

The filtration apparatus 100 includes feed piping 101, which is connected to the tubular channel 11a of the cap 11 in the hollow fiber membrane module 1 and feeds water to be processed, and circulation piping 102, which is connected the tubular channel 10a of the cap 10 and sends out circulation water. Further, pressure gauges Pi, Po, valves 101a, 102a and the like are arranged in the feed piping 101 and the circulation piping 102. Further, the filtration apparatus 100 includes an upper filtrate discharge tube 103 and a lower filtrate discharge tube 104, as flow channels of filtrate. The upper filtrate discharge tube 103 and the lower filtrate discharge tube 104 are connected to a junction tube 105 of filtrate. Further, the junction tube 105 communicates with external piping (not illustrated). Here, pressure gauge Pf, a valve 105a and the like are arranged in the junction tube 105.

The hollow fiber membrane module 11 is arranged in an upright position. Further, the upper nozzle 5c is connected to the upper filtrate discharge tube 103, and the lower nozzle 5d is connected to the lower filtrate discharge tube 104.

Water to be processed is introduced, at predetermined pressure, from the feed piping 101 into the hollow fiber membrane module 1 through the tubular channel 11a. The water to be processed is introduced into a hollow portion of each of hollow fiber membranes 2, and filtered by the hollow fiber membranes 2. Further, the filtrate permeates out from the outer surface of each of the hollow fiber membranes 2. The filtrate is discharged to the junction tube 105 through the upper filtrate discharge tube 103 or the lower filtrate discharge tube 104, and collected through external piping. Meanwhile, water to be processed that has passed through the hollow fiber membranes 2 is discharged from the tubular channel 10a of the cap 10, as circulation water, and sent out to the circulation piping 102.

Next, with reference to FIG. 20 through FIG. 22, a result in which the distribution of fluid velocities in the hollow fiber membrane module of the present disclosure was obtained by simulation will be described. In addition, with reference to FIG. 23 through FIG. 25, a result in which the distribution of fluid velocities in a conventional hollow fiber membrane module, as a comparative example, was obtained by simulation will also be described.

Figure 23:
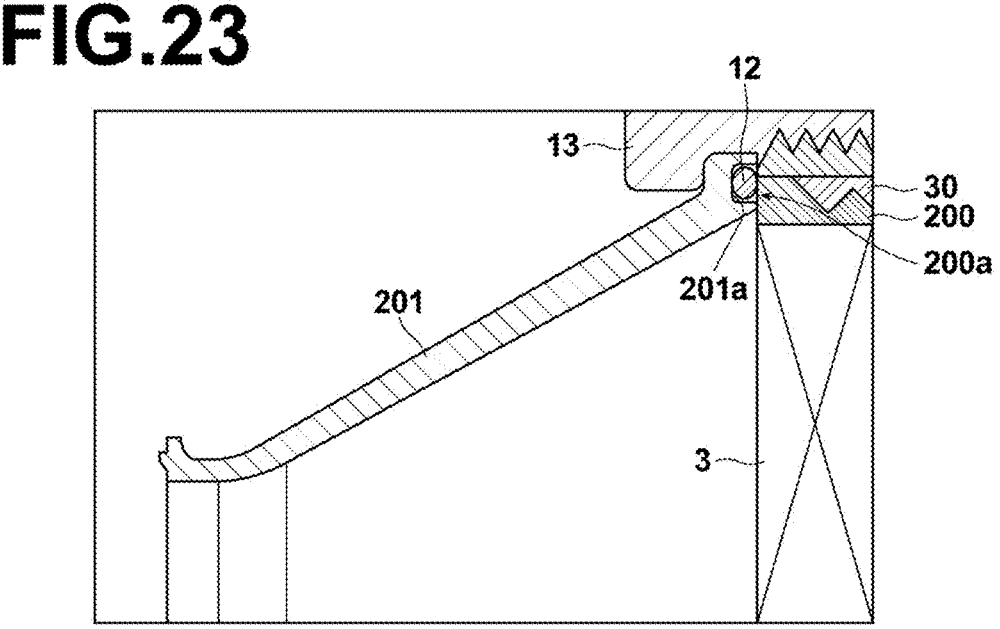
FIG. 23 is a schematic diagram illustrating a model corresponding to related art, and which was used to simulate the distribution of velocities of filtrate in a hollow fiber membrane module.

First, simulation conditions will be described. As simulation software, "PHOENICS", which is heat fluid analysis software provided by CHAM Limited (Concentration, Heat and Momentum Limited), was used, and as calculation expression, the expression of KE-CHEN was used. Fluid was water at 20° C. Further, a model corresponding to the present disclosure illustrated in FIG. 20 and a model of a comparative example, which corresponds to related art, illustrated in FIG. 23 were used as simulation models of the hollow fiber membrane modules. Elements in FIG. 20 are the same as the elements described already, and a hollow fiber membrane bundle 3, a cap 10, an O-ring 12, a nut 13, a rectifier tube 30, and potting material 31 are illustrated. Meanwhile, in the comparative example of FIG. 23, a hollow fiber membrane bundle 3, an O-ring 12, potting material 200 and a cap 201 are illustrated. Further, a surface 200a is a flat surface of the potting material 200 facing the cap 201. An O-ring housing groove 201a is provided on the cap 201, and a flat surface facing the potting material 200 is also formed in this O-ring housing groove 201a. In the structure of FIG. 23, the two flat surfaces hold the O-ring 12 therebetween. In the structure of FIG. 20 and FIG. 23, water is assumed to flow under the caps 10, 201, respectively, from the left side to the right side of the drawings.

Figure 20:
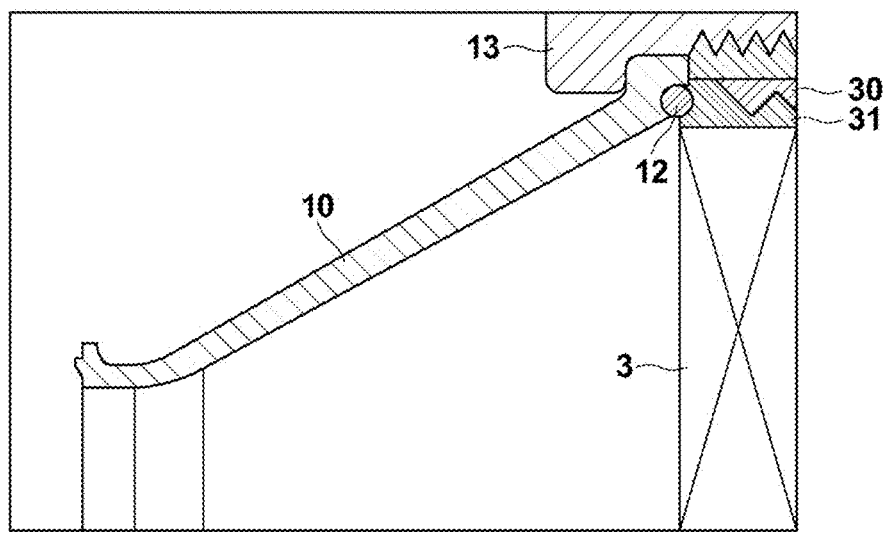
FIG. 20 is a schematic diagram illustrating a model corresponding to the present disclosure, which was used to simulate the distribution of velocities of filtrate in a hollow fiber membrane module.

In both of the model of FIG. 20 and the model of FIG. 23, a 2D model, obtained by dividing a module in half in the vertical direction (the longitudinal direction of the housing) was used. In the 2D model of FIG. 20, a length from a flow-in position of water to a position at which the water reaches a part of the hollow fiber membrane bundle is 0.157 m, the maximum half radius of the cylindrical housing case is 0.115 m, the size in a direction orthogonal to the paper surface of FIG. 20 is $6 \times 10^{-4}$ m, and the inclination angle of the inner surface of the cap (an angle with respect to a surface orthogonal to the longitudinal direction of the housing case) is 150°. Meanwhile, in the 2D model of the comparative example of FIG. 23, a length from a flow-in position of water to a position at which the water reaches a part of the hollow fiber membrane bundle is 0.157 m, the maximum half radius of the cylindrical housing case is 0.132 m, the size in a direction orthogonal to the paper surface of FIG. 23 is $6 \times 10^{4}$ m, and the inclination angle of the inner surface of the cap is 150°. Further, the number of mesh cells of the simulation model (the division number of the model) is 33000 in the model of FIG. 20, and 38640 in the model of FIG. 23. The SWEEP number of fluid is 1000 times, and a flow-in amount of water is 2.64 m/s for both of the model of FIG. 20 and the model of FIG. 23. Here, the flow-in amount of water represented by linear velocity is calculated from an original flow-in amount and the area of the cross section of an opening in each of the models. Further, each of resistance values of the hollow fiber membrane bundle in the cylindrical housing case in x direction (a horizontal direction in FIGS. 20, 23) and y direction (a vertical direction in FIGS. 20, 23) is 0.4, and porosity is 0.7.

Figure 21:
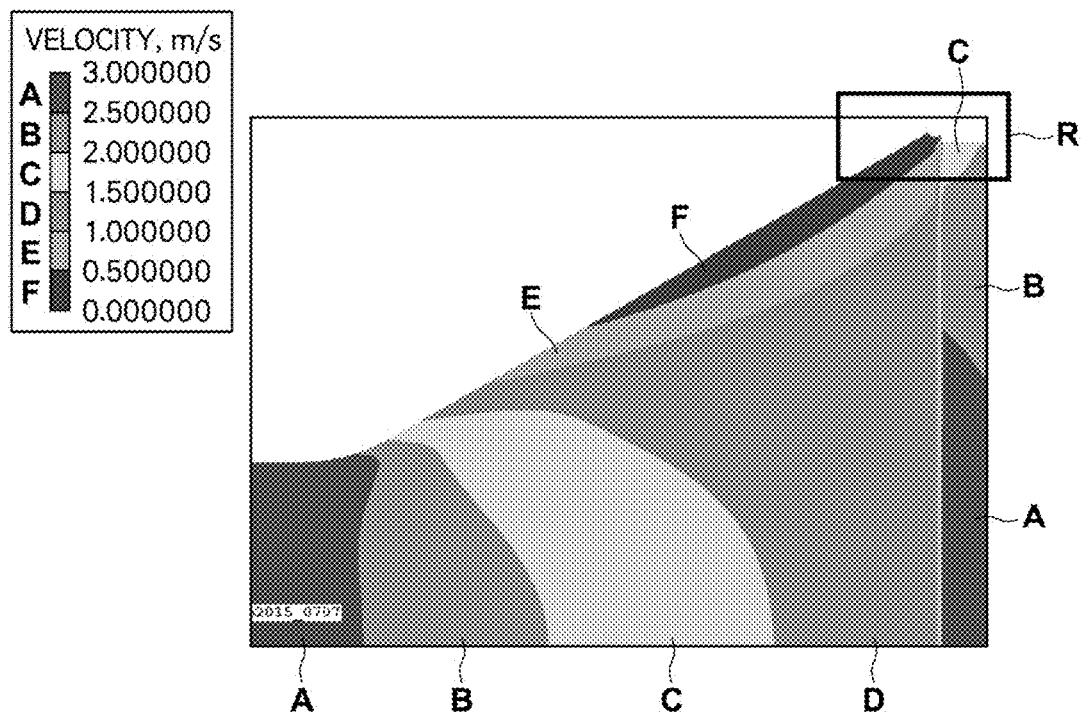
FIG. 21 is a diagram illustrating a simulation result of the distribution of velocities of filtrate obtained about the model of FIG. 20.
Figure 22:
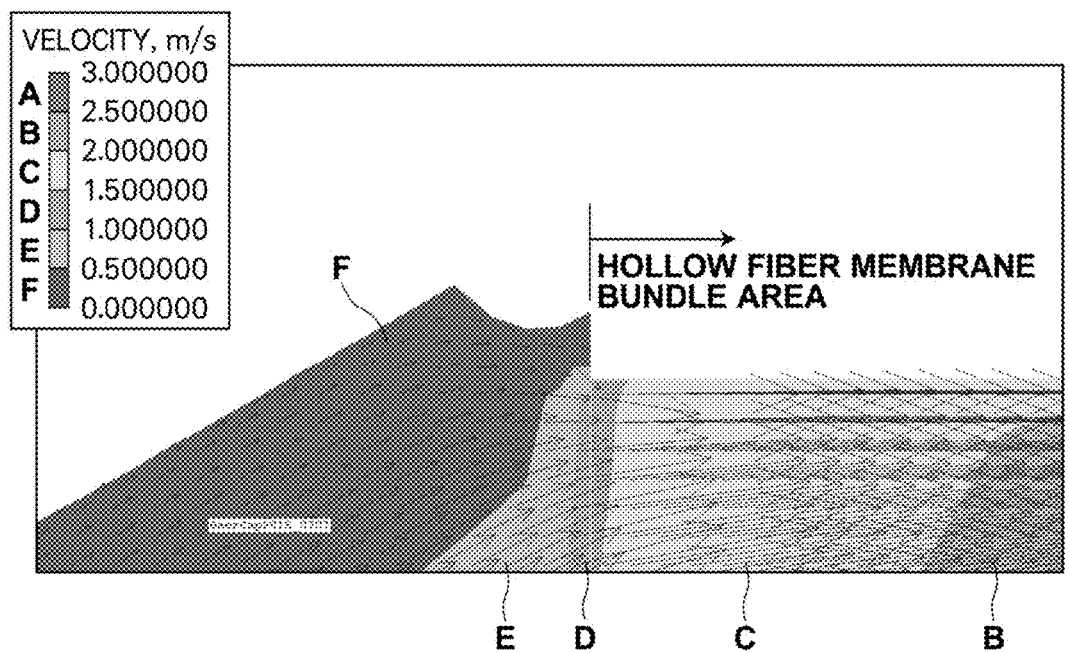
FIG. 22 is an enlarged diagram illustrating a part of the simulation result of FIG. 21.

FIG. 21 and FIG. 22 are diagrams illustrating results of simulation performed under the aforementioned simulation conditions about the model of FIG. 20. In FIG. 22, a result in rectangular area R illustrated in FIG. 21 is enlarged. In these diagrams, the distribution of velocities of water is represented by gradation, and particularly in FIG. 22, a direction in which water flows is indicated by an arrow, and the magnitude of the velocity of water is represented by the length of the arrow. Specifically, a longer arrow represents higher velocity.

Figure 24:
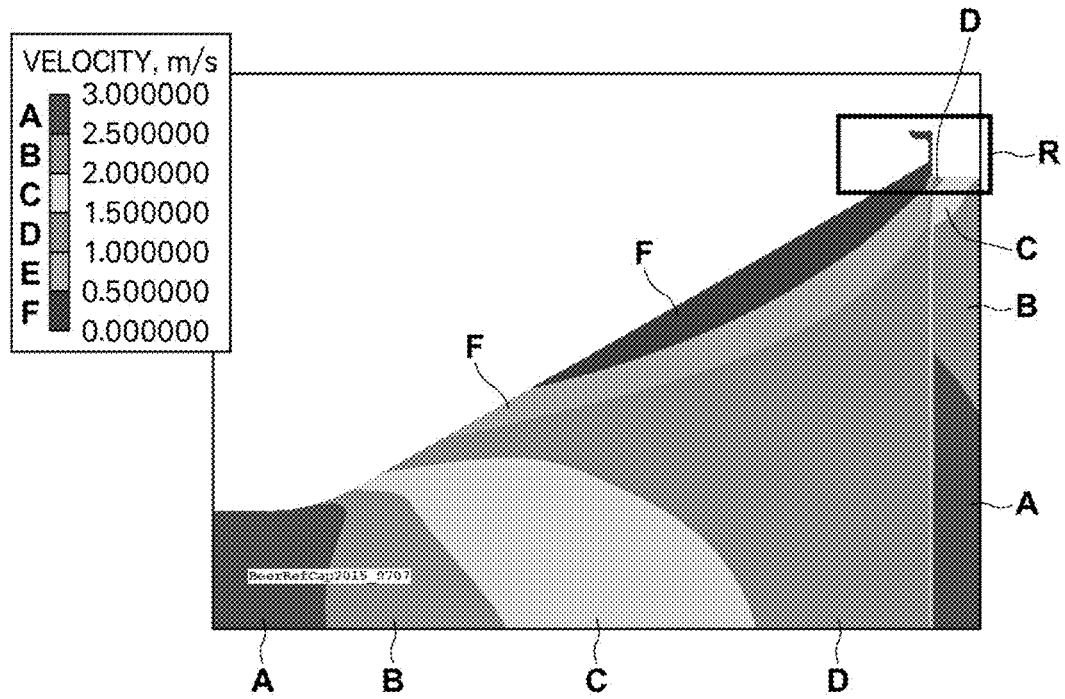
FIG. 24 is a diagram illustrating a simulation result of the distribution of velocities of filtrate obtained about the model of FIG. 23.
Figure 25:
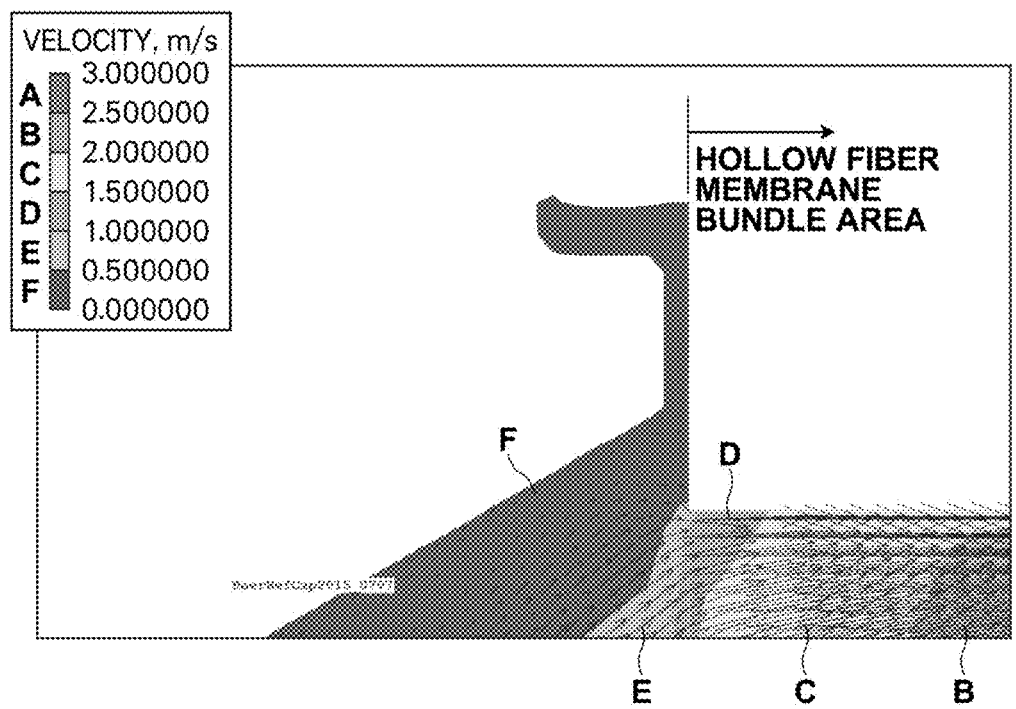
FIG. 25 is partially enlarged diagram illustrating the simulation result of FIG. 24.

Further, FIG. 24 and FIG. 25 are diagrams illustrating a result of simulation under the aforementioned conditions about the model of FIG. 23. In FIG. 25, a result in rectangular area R illustrated in FIG. 24 is enlarged. In these diagrams, the manner of representing the velocity of water is the same as the manner of representation in FIG. 21 and FIG. 22.

When the simulation result of FIG. 22 and the simulation result of FIG. 25 are compared with each other, it is observable that the velocity of water in the vicinity of the O-ring in the simulation result of FIG. 22 is generally higher. This supports our finding that the O-ring arrangement structure in the hollow fiber membrane module of the present disclosure is effective also in reducing stagnation by maintaining the velocity of fluid in the vicinity of the O-ring at a high level.

What is claimed is:

1. A hollow fiber membrane module comprising:
    a hollow fiber membrane bundle composed of a plurality of hollow fiber membranes bundled together;
    a tubular housing case that houses the hollow fiber membrane bundle;
    potting material that bonds and fixes the hollow fiber membranes together at least at an end portion of each of the hollow fiber membranes, and fills a space reaching an inner circumferential surface of the housing case;
    a cap attached to each of both ends of the housing case, wherein an end face of the cap abuts an axial end face of the both ends of the housing case to which the cap is attached, and
    the end face of the cap abutting an axial end face of the potting material; and
    an O-ring closely held by the potting material and the cap, wherein a whole area of the O-ring between a first contact point and a second contact point is exposed when the area is viewed from a central axis passing through a center of the ring shape of the O-ring, the first contact point being a point of contact between the O-ring and the cap, which faces an inner cavity defined by the end face of the potting material facing the cap, an inner circumferential surface of the O-ring and an inner circumferential surface of the cap, and the second contact point being a point of contact between the O-ring and the potting material, which faces the inner cavity.

2. The hollow fiber membrane module, as defined in claim 1, wherein the first contact point is located closer to the potting material than a point located furthest toward the cap in the direction of the central axis on the inner circumferential surface of the O-ring.

3. The hollow fiber membrane module, as defined in claim 1, wherein the second contact point is located closer to the cap than a point located furthest toward the potting material in the direction of the central axis on the inner circumferential surface of the O-ring.

4. The hollow fiber membrane module, as defined in claim 2, wherein the second contact point is located closer to the cap than a point located furthest toward the potting material in the direction of the central axis on the inner circumferential surface of the O-ring.

5. The hollow fiber membrane module, as defined in claim 1, wherein an angle formed by a straight line connecting the first contact point and the second contact point and at least one of the inner circumferential surface of the cap and the end face of the potting material is an obtuse angle on a cross section passing through a central axis of the housing case.

6. The hollow fiber membrane module, as defined in claim 2, wherein an angle formed by a straight line connecting the first contact point and the second contact point and at least one of the inner circumferential surface of the cap and the end face of the potting material is an obtuse angle on a cross section passing through a central axis of the housing case.

7. The hollow fiber membrane module, as defined in claim 3, wherein an angle formed by a straight line connecting the first contact point and the second contact point and at least one of the inner circumferential surface of the cap and the end face of the potting material is an obtuse angle on a cross section passing through a central axis of the housing case.

8. The hollow fiber membrane module, as defined in claim 4, wherein an angle formed by a straight line connecting the first contact point and the second contact point and at least one of the inner circumferential surface of the cap and the end face of the potting material is an obtuse angle on a cross section passing through a central axis of the housing case.

9. The hollow fiber membrane module, as defined in claim 1, wherein a distance between the first contact point and the second contact point is 15% or more and 50% or less of the diameter of a cross section of the O-ring.

10. The hollow fiber membrane module, as defined in claim 1, wherein an angle formed by a straight line on the inner circumferential surface of the cap and a tangent, with respect to a cross-section of the O-ring, passing through the first contact point exceeds 0 degree when viewed with respect to a cross section passing through a central axis of the housing case.

11. The hollow fiber membrane module, as defined in claim 1, wherein an angle formed by a straight line on the end face of the potting material facing the cap and a tangent, with respect to a cross-section of the O-ring, passing through the second contact point exceeds 0 degree when viewed with respect to a cross section passing through the central axis of the housing case.

12. The hollow fiber membrane module, as defined in claim 1,
wherein an inner surface of the cap has a tapered surface in which the diameter of the inner surface gradually increases as approaching the housing case, and
wherein the tapered surface and the end face of the potting material are connected to each other through only a circumferential surface of the O-ring therebetween.

13. The hollow fiber membrane module, as defined in claim 1, further comprising:
an third contact point between the cap and the potting material, wherein
the first contact point, the second contact point and the third contact point define vertices of a triangle.

* * * * *